Jan. 5, 1926.
D. F. O'BRIEN
1,568,911
SHOCK ABSORBING DEVICE FOR HANDLE BARS OF MOTOR CYCLES AND THE LIKE
Filed April 23, 1925
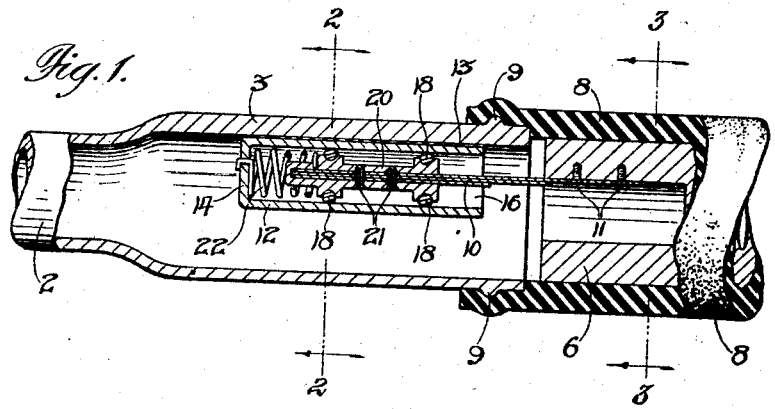
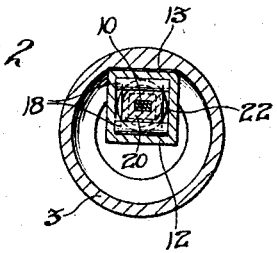
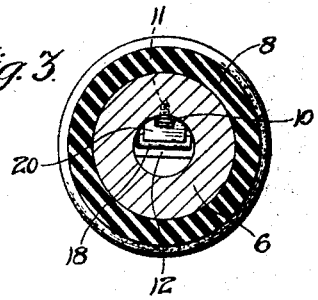
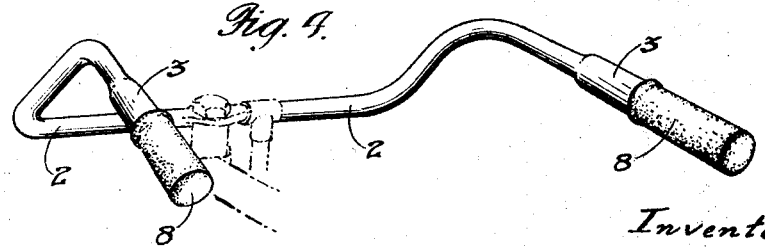
Inventor:
Douglas Francis O'Brien
By
Attorney Patented Jan. 5, 1926.

1,568,911

UNITED STATES PATENT OFFICE.

DOUGLAS FRANCIS O'BRIEN, OF MELBOURNE, VICTORIA, AUSTRALIA.

SHOCK-ABSORBING DEVICE FOR HANDLE BARS OF MOTOR CYCLES AND THE LIKE.

Application filed April 23, 1925. Serial No. 25,292.

*To all whom it may concern:*

Be it known that I, DOUGLAS FRANCIS O'BRIEN, a subject of the King of Great Britain and Ireland, and a resident of Melbourne, county of Bourke, State of Victoria, Commonwealth of Australia, have invented a certain new and useful Improved Shock-Absorbing Device for the Handle Bars of Motor Cycles and the like, of which the following is a specification.

This invention relates to a shock absorbing device for attachment to the handle bars of motor cycles and similar machines, whereby the transmission of objectionable road-shocks and vibrations to the rider thereof is effectively nullified.

Hitherto the handle bars of such machines have been provided with various types of rubber or resilient hand-grips in an attempt to accomplish the object referred to, but these devices have not proved eminently successful in practice.

The object of the present invention is to overcome the objections referred to, by the provision of a simple and inexpensive device which is highly efficient in operation and capable of being readily applied to the handle bars of existing motor cycles and the like.

Referring to the drawings which form part of this specification:—

Figure 1 is a longitudinal sectional view showing a suitable embodiment of the invention applied to a motor cycle handle bar.

Figure 2 is a cross section on line 2—2 of Figure 1.

Figure 3 is a cross section on line 3—3 of Figure 1.

Figure 4 is a perspective view on a reduced scale, showing the invention applied to the handle bars of a motor cycle or the like.

According to a preferred embodiment of the invention, each handle bar 2 of the machine has resiliently attached thereto by means of suitable spring connections as hereinafter described, a hand grip which may comprise an inner sleeve 6 of metal or the like surrounded by an outer sleeve or casing 8 of rubber or like flexible material.

The outer casing 8 of rubber or the like preferably extends forwardly over the rear end 3 of the respective handle bar where it may be detachably retained by an annular rib or swelling 9 in order to exclude moisture and other foreign matter from the interior of the handle bar and the resiliently mounted hand grip.

The hand grips abovementioned are resiliently connected to the respective handle bars, adjacent and in longitudinal alignment with the outer or rear end portions 3 thereof, the connection being made by means of a longitudinal supporting spring 10 which may be of the plate or laminated leaf type and which is attached to the inner sleeve 6 of the hand grips by screws, rivets or other means as at 11.

Situated within the hollow end portion 3 of each handle bar adjacent said longitudinal supporting spring 10 and secured to the upper part thereof by soldering, brazing or other suitable means as indicated at 13, is an internal guide member 12. This guide member may comprise a hollow rectangular box or casing, the inner end 14 of which may be closed, while its outer end 16 is open or has an opening to freely pass the longitudinal supporting spring 10.

Freely mounted within the aforesaid guide member 12 by means of a series of rollers, ball bearings or like antifriction devices 18 which permit of longitudinal movement of the respective hand grip, is a spring holder 20 which is adapted to accommodate and retain by means of screws, rivets or other means as at 21, the inner portion of the hand grip supporting spring 10 which passes through the aforesaid open outer end 16 of the internal guide member 12.

The said spring holder 20 has also associated therewith a coiled spring 22 which may be arranged between the spring holder 20 and the inner end 14 of the guide member 12 as shown in Figure 1. This coiled spring is adapted to limit the longitudinal movement of the spring holder 20, and at the same time it provides a cushioning effect which absorbs any longitudinal shocks imparted to the handle bar. The transmission of such shocks to the resiliently mounted hand grip is thus prevented.

In operation when the handle bars of the motor cycle or the like are being subjected to road shocks or vibrations, the vertical shocks or vibrations are absorbed by the aforesaid laminated or plate springs 10 which support the hand grips. Longitudinal shocks or vibrations are absorbed by the coiled springs 22 acting to yieldingly limit or retard movement of the spring holders 20 within the internal guide members 12.

It will be evident from the foregoing that the hand grips are resiliently supported against all road shocks and vibrations by means of the spring devices which are neatly housed within the usual hollow rear end portions 3 of the handle bar, the outer end portions of the longitudinal supporting springs 10 being extended beyond the rear ends of the handle bars to resiliently support the hand grips as above described.

Whilst it is not essential that the rubber sleeves 8 of the hand grips should extend over the rear ends of the handle bars as abovementioned, this arrangement provides a neat appearance and effectively excludes rain water and other foreign matter from the internal parts thus obviating rust and injury thereto.

It will be evident that the invention may be readily applied to existing handle bars and does not interfere with the engine control devices which are commonly mounted upon or within the handle bars of motor cycles.

Having now described my invention what I claim as new and desire to secure by Letters Patent is:—

1. A shock absorbing device for the handle bars of motor cycles and the like comprising a spring mounted within and projecting longitudinally from the rear end of the handle bar, and a hand grip comprising an inner metal sleeve mounted on and fastened directly to the rear or projecting portion of said spring and an outer sleeve or casing of flexible material surrounding said inner sleeve.

2. A shock absorbing device for the handle bars of motor cycles and the like comprising a spring mounted within and projecting longitudinally from the rear end of the handle bar, and a hand grip comprising an inner metal sleeve mounted on the rear or projecting portion of said spring and an outer sleeve or casing of flexible material surrounding said inner sleeve, the front portion of said outer sleeve extending over and fitting closely around the rear portion of the handle bar.

3. A shock absorbing device for the handle bars of motor cycles and the like comprising a spring mounted within the rear end portion of the handle bar so as to be capable of longitudinal movement in relation to the latter, and a hand grip resiliently mounted on the rear end portion of said spring which projects from the rear end of the handle bar.

4. A shock absorbing device for the handle bars of motor cycles and the like comprising in combination a guide member mounted within the hollow end portion of the handle bar, a spring mounted to move longitudinally within said guide member, and a hand grip resiliently mounted on the rear portion of said spring which projects from the rear end of the handle bar.

5. A shock absorbing device for the handle bars of motor cycles and the like comprising a spring holder mounted within the hollow end portion of the handle bar so as to be capable of longitudinal movement in relation to the latter, a spring having its forward portion mounted in said holder and its rear portion projecting from the rear end of the hollow handle bar, and a hand grip resiliently mounted on the rear portion of said spring.

6. A shock absorbing device for the handle bars of motor cycles and the like comprising in combination a spring projecting rearwardly from the handle bar and mounted to move longitudinally in relation thereto, a hand grip resiliently mounted on said spring in rear of the handle bar, and a coiled spring adapted to absorb and limit the longitudinal movement of the first-named spring and hand grip.

7. A shock absorbing device for the handle bars of motor cycles and the like comprising in combination a guide member mounted within the hollow end portion of the handle bar, a spring holder mounted to move longitudinally in said guide member, a spring carried by said holder and projecting rearwardly through the open rear end of the handle bar, a hand grip mounted on said spring in rear of the handle bar, and a coiled spring associated with said holder and adapted to absorb and limit the longitudinal movement thereof.

8. A shock absorbing device for the handle bars of motor cycles comprising in combination a guide member mounted within the hollow end portion of the handle bar, a spring holder mounted to move longitudinally on said guide member, a spring carried by said holder and projecting rearwardly through the open rear end of the handle bar, a hand grip mounted on said spring in rear of the handle bar, and a coiled spring interposed between said guide member and holder to absorb the longitudinal movement of the latter and the hand grip.

9. A shock absorbing device for the handle bars of motor cycles and the like comprising in combination a guide member mounted within the hollow end portion of the handle bar, a spring holder mounted in said guide member so as to be capable of longitudinal movement in relation thereto, anti-friction rollers or members disposed between said spring holder and guide member, a spring attached to said holder and projecting rearwardly therefrom through the open rear end of the handle bar, a hand grip resiliently mounted on the projecting rear portion of said spring in longitudinal alignment with the handle bar, and a second spring adapted to absorb the longitudinal movement of said holder and hand grip.

10. A shock absorbing device for the handle bars of motor cycles and the like comprising in combination a guide member mounted within the hollow end portion of the handle bar, a rearwardly extending spring mounted to move longitudinally within said guide member, a hand grip mounted on said spring in rear of the handle bar, said hand grip comprising an inner member which is secured to said spring, and an outer flexible sleeve which surrounds said inner member and projects forwardly over the rear end of the handle bar, and a second spring adapted to absorb the longitudinal movement of the first named spring and the hand grip.

11. A shock absorbing device for the handle bars of motor cycles and the like comprising in combination a hand grip mounted behind and in longitudinal alignment with the rear end of the handle bar, a spring connection between said hand grip and handle bar end to resiliently support the former from the latter, and a rubber sleeve fitting closely around said hand grip and the terminal of said handle bar end so as to enclose said spring connection.

In testimony whereof I affix my signature.

D. F. O'BRIEN.